July 24, 1928.

1,678,026

J. R. VOORHEES

FRICTION CLUTCH

Filed Jan. 31, 1927

Inventor
John R. Voorhees.

By G.C. Kennedy.
Attorney

Patented July 24, 1928.

1,678,026

UNITED STATES PATENT OFFICE.

JOHN R. VOORHEES, OF CEDAR FALLS, IOWA.

FRICTION CLUTCH.

Application filed January 31, 1927. Serial No. 164,811.

My invention relates to improvements in friction clutches, and the object of my improvement is to include with such a device anti-friction means between the members of the clutch actuating mechanism and means for adjusting said anti-friction means relative to a propelling element of the clutch.

Another object of my improvements is to also support such anti-friction means swingingly and having means for limiting the scope of the swinging thereof.

Figure 1:
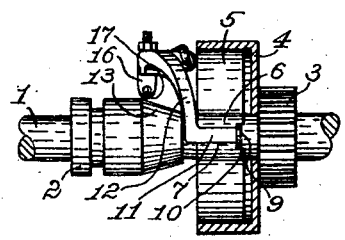
Figure 2:
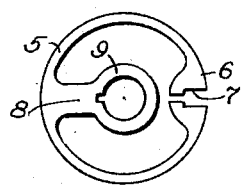
Figure 3:
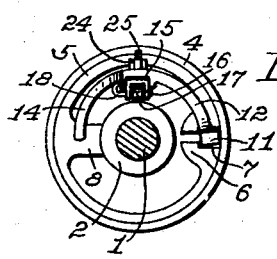
Figure 6:
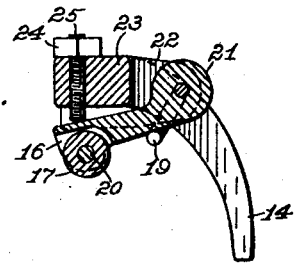
Figure 4:
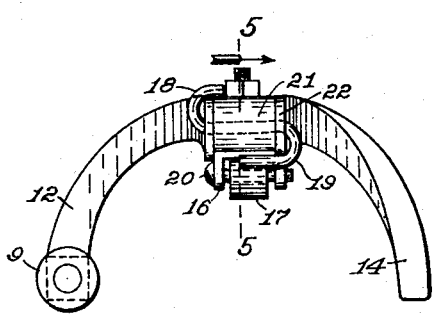
Figure 5:
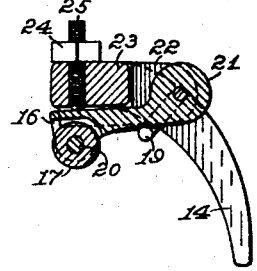

I have accomplished the above objects by the means which are hereinafter described and claimed, and which are illustrated in the annexed drawings, in which Fig. 1 is a side elevation of my improved friction clutch with a part in section. Fig. 2 is an end elevation of the split-ring clutch member only. Fig. 3 is an end elevation of the friction clutch, with the shaft in cross section. Fig. 4 is an enlarged end elevation of the clutch actuating arm with the anti-friction device mounted thereon, and Fig. 5 is a section taken medially through said arm and anti-friction device on the broken line 5—5 of Fig. 4. Fig. 6 is a like section to that of Fig. 5, showing an adjusted position of the anti-friction means thereon.

This invention constitutes improvements upon my own previous United States patent for friction-clutch, No. 1,091,783, dated March 31, 1914, and said improvements are to cover new modifications thereof within the protection of the claims herein.

Upon a rotatable shaft 1 is loosely non-slidably mounted a connected pinion 3 and clutch rim 4, the latter opening toward a coned sleeve 2 mounted slidably on the shaft 1. A split-ring 5 with hub 9 is fixed on the shaft, its elastic arms widened at their terminations and having recessed bearing seats 7, the arms of the split-ring being integral with an arm 8 of the hub 9.

As shown in my said prior device I herein insert in the recesses 7 the offset elongated rectangular head 11 to fit the recesses when not rocked therein. The recess 7 has at each end wall of the split ring an offset shoulder which prevents inward shifting of the head 11. The head 11 is a termination of an arcuate arm 12 which is arched over the coned end 13 of the sliding hub or sleeve 2 and terminates at its opposite end in a finger part 14 which is directed toward the ring arm 8 to contact therewith.

The middle part of the arcuate arm 12 is provided with an interiorly threaded hole radial relative to the shaft 1 to receive a threaded stem 25 having a nut 24 on its outer end.

The middle part 23 of the arm 12 also has integral spaced and apertured lugs 22 extending longitudinally toward the clutch rim 4, their apertures in alinement seating a pintle rod whose end parts project oppositely from the lugs and are bent over into hooks 18 and 19, to contact with the edges of the lugs. An arm 21 is pivotally mounted on the pintle between said lugs and has a terminal recess 16 at its free end whose side walls are apertured in alinement to seat a cross pintle 20 on which is mounted an anti-friction roller 17, the roller abutting the coned end 13 of the slide sleeve 2. The arm 12 is recessed at 15 to seat the outer end of said arm 21.

When the sleeve 2 by any desired means is pushed toward the clutch ring 5, its coned part 13 slides contactingly over the roller 17 pushing radially outwardly upon the stem 25 as the arm 21 swings upon its pintle. The squared head 11 of the arcuate arm 12 is rocked in its seat recesses 7 as shown in Fig. 3 to spread apart the split-ring elastic arms to frictionally engage the inner wall of the clutch rim 4, thus causing the gear-wheel 3 to rotate with the shaft.

It will be noted that the threaded stem 25, by turning the nut 24, engages with and adjusts the position of the arm 21 radially, so that the anti-friction roller may contact with the coned sleeve 2 to take up for wear or to accommodate for slight differences in different sleeves.

The finger part 14 of the arm 12 engages the clutch ring 5 at 8 and prevents torsion of the clutch ring when the block 11 of the arm 12 is rocking to spread the arms of the split ring.

The hooked ends 18 and 19 of the pintle of the arm 21 function, the one to engage the outer edge of one lug 22 while the other engages and stops the arm 21 to restrict its swinging movement away from the arm part 23. This is convenient in the installation, as sufficient play is allowed the arm 21 for purposes of adjustments.

Having described my invention, what I claim as new, and desire to secure by Letters Patent, is:

1. A friction clutch, comprising in combination, a rotatable shaft, an open cylincrical clutch-member mounted loosely nonslidably thereon, an elastic split-ring clutch-body fixed on said shaft within said clutch-member, a terminally coned sleeve slidably mounted upon said shaft adjacent said clutch-body, an arcuate arm astride of the coned part of said sleeve and having a squared termination seated between the separated ends of said split-ring clutch-body, spaced lugs on said arcuate arm, an arm pivotally mounted between said lugs, a pintle-rod connecting said lugs and on which said arm is mounted, an anti-friction roller on said arm, and said pintle-rod having its ends hooked to act as stops against unrestricted swinging of said arm, and means movably mounted on the arcuate arm for adjusting the position of the last-mentioned arm and roller relatively to said coned sleeve.

2. A friction clutch, comprising in combination, a rotatable shaft, a clutch member with a cylindrical rim loosely mounted thereon, a hub fixed on said shaft and having an arm provided with an integral split friction-ring whose parts are elastic and widened at their extremities with the meeting edges of each extremity cut away to provide like opposed bearing-seats, a rectangular block seated in said seats and having an arcuate arm arched over said shaft to movably bear against said friction-ring arm, a coned sleeve slidable on said shaft under said arcuate arm, an adjustable set-screw mounted on said arm, means for holding said set-screw in an adjusted position, an anti-friction roller and carrying arm therefor swingingly mounted on said arm with the last-mentioned arm engaged by said set-screw, and a stop element torsionally bendably connected to said arcuate arm and directed movably relative to the second-mentioned arm to limit swinging movements thereof in one direction.

In testimony whereof I affix my signature.

JOHN R. VOORHEES.